US007657451B2

(12) United States Patent
Dubois et al.

(10) Patent No.: US 7,657,451 B2
(45) Date of Patent: Feb. 2, 2010

(54) SIX SIGMA ENABLED WEB-BASED BUSINESS INTELLIGENCE SYSTEM

(75) Inventors: Timothy M Dubois, Moss Beach, CA (US); Jacques Senchet, San Francisco, CA (US); Craig Martell, Lilburn, GA (US); Guna (Ned) Nedumaran, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 681 days.

(21) Appl. No.: 09/851,732

(22) Filed: May 8, 2001

(65) Prior Publication Data

US 2009/0063209 A1    Mar. 5, 2009

Related U.S. Application Data

(60) Provisional application No. 60/248,267, filed on Nov. 13, 2000.

(51) Int. Cl.
*G06Q 10/00* (2006.01)
(52) U.S. Cl. .......................................................... 705/7
(58) Field of Classification Search ...................... 705/7
See application file for complete search history.

(56) References Cited

U.S. PATENT DOCUMENTS 6,532,427 B1 * 3/2003 Joshi et al. ..................... 702/84
6,725,183 B1 * 4/2004 Cawse ............................ 703/2
6,853,920 B2 * 2/2005 Hsiung et al. ................... 702/1

OTHER PUBLICATIONS

Stephen Quality Software, SPC Software—DataLyzer® Spectrum, Oct. 13, 1999 [online: URL www.datalyzer.com [Wayback Machine] retrieved on May 31, 2005.*
Statware News Release, Statware Integrates With Oracle Applications, Jun. 30, 1999 [Google].*
Microsoft Press Computer Dictionary, Third Edition, Microsoft Press, 1997.*
"Constructing the Integrated Data Warehouse with Cognos e-applications", Sep. 2000, pp. 1-19.*
Oracle: Oracle delivers global sales and marketing analysis to the web M2 Presswire. Coventry: Sep. 21, 1999. p. 1.*

(Continued)

*Primary Examiner*—Jonathan G Sterrett
(74) *Attorney, Agent, or Firm*—Townsend and Townsend and Crew LLP

(57) ABSTRACT

A method of presenting an analysis of enterprise wide business data. In response to a user request to a web site operable to access enterprise wide business data and to provide statistical analysis, a six sigma enabled BIS transfers an electronic document to the user. The electronic document allows the user to select dimensions to specify which data to analyze for a given performance measure. Then, in response to a request from the user for a statistical analysis, the six sigma enabled BIS performs a statistical analysis of the performance measure and transfers an electronic copy of the statistical analysis to the user. In one embodiment the document comprises a histogram. The histogram has an overlay indicator of the statistical mean, as well as a target limit. In this fashion, the user may view the variance in the data, and see how much data are outside the target range.

20 Claims, 7 Drawing Sheets

OTHER PUBLICATIONS

Looking for the right fit Sidney Hill Jr. Manufacturing Systems. Wheaton: Aug. 1999. vol. 17, Iss. 8; p. 28, 6 pgs.*

Component-based knowledge engineering architecture, Won Kim, Ki-Joon Chae, Dong-Sub Cho, Byoungju Choi, et al. Journal of Object—Oriented Programming. New York: Oct. 1999.vol. 12, Iss. 6; p. 40, 10 pgs.*

Oracle Announces Licensing Agreement With Roadmap Technologies to Accelerate Demand Planning and Business Forecasting Process PR Newswire. New York: Sep. 28, 1999. p. 1.*

Digging for nuggets of data, Michael Lattig, Bob Trott. InfoWorld. San Mateo: Apr. 26, 1999.vol. 21, Iss. 17; p. 1, 2 pgs.*

Application of intelligent agent technology for managerial data analysis and mining, Ranjit Bose, Vijayan Sugumaran. Database for Advances in Information Systems. New York: Winter 1999.vol. 30, Iss. 1; p. 77, 18 pgs.*

Enterprise Information Portals—Move over Yahoo!; the Enterprise Information Portal is on its Way, Christopher C Shilakes, Julie Tyman. Merrill Lynch Industry Report- . Nov. 16, 1998, 64 pgs, retrieved from the web at ikt.hia.no/perep/eip_ind.pdf.*

Cognos® Announces Multi-Million Dollar Agreement with GE's Employers Reinsurance Corporation PRNewswire. . New York, Aug. 9, 2000, pg. ProQuest Document ID 57711097.*

Business Intelligence Elite Descend on Redwood Shores for Strategy Briefing with Oracle™ PRNewswire. New York, Nov. 12, 1999, p. 1 ProQuest Document ID 46314117.*

One Vendor, One Solution, Talita Baron, InformationWeek, Manhasset, Nov. 8, 1999, Iss. 760, p. 108, 3 pgs.*

Oracle™ New Express® Server 6.3 Provides Fastest Answers to Business' Hardest Qeustions PRNewswire, New York, Nov. 8, 1999, p. 1 ProQuest Document ID 46197918.*

GE IT Chief reviews progress Shane Shick, Computer Reseller News, Willowdale, Jul. 30, 1999, vol. 15, Iss. 29, p. 10, 1 pgs. ProQuest Document ID 43776177.*

Predicting Movement Barry Grushkin, Intelligent Enterprise, San Mateo, Aug. 3, 1999, vol. 2, Iss. 11, p. 18, 8 pgs, ProQuest Document ID 43597990.*

SAS partners on workgroup software Rogoski, Richard R. Triangle Business Journal. Raleigh: Oct. 22, 1999. vol. 15, Iss. 7; p. 31.*

The domino theory Steve Gillmor, Jeff Angus. InformationWeek. Manhasset: Nov. 23, 1998. , Iss. 710; p. 48, 5 pgs.*

Over "Enterprise Information Portals—Move over Yahoo!; the Enterprise Information Portal is on its Way," Christopher C Shilakes, Julie Tyman. Merrill Lynch Industry Report- . Nov. 16, 1998, 64 pgs, retrieved from the web at ikt.hia.no/perep/eip_ind.pdf.*

Harry, M.; "The Vision of Six Sigma: Tools and Methods For Breakthrough"; 1994 (pp. 2.5 and 9.24).

* cited by examiner

SIX SIGMA ENABLED WEB-BASED BUSINESS INTELLIGENCE SYSTEM

RELATED U.S. APPLICATION

This application claims priority to U.S. Provisional Application entitled, "Six Sigma Enabled Business Intelligence System," Application No. 60/248,267, filed on Nov. 13, 2000, which application is hereby incorporated by reference.

FIELD OF THE INVENTION

The present invention relates to the field of business performance measuring. Specifically, the present invention relates to a system for providing sophisticated statistical analysis via a web-based business intelligence system.

BACKGROUND ART

To survive today companies must continuously improve quality and reduce the variability in every process throughout the organization. Access to data and the capability to analyze that data are the keys to reducing defects and increasing customer satisfaction, thus leading to increased productivity and greater top and bottom line growth.

Conventional business intelligence systems (BIS) allow a company to view and analyze performance measures across a business enterprise. These systems have useful functions such as: an ability to view data in a graphical or tabular format, to drill down to lower levels of data, and to alert the user if a performance measurement goes outside a target value. Some conventional systems are web-based and provide a configurable home page. Some conventional systems may have a library of performance measures or key performance indicators to benchmark actual performance against multiple targets. However, these conventional systems do not have the capability to present complex statistical analysis in a user friendly format, which is crucial to reducing defects and improving processes.

Referring to FIG. 1, a typical BIS report offers a view of a given performance measure, for example, book-to-ship cycle time. It provides a standard bar or line graph 170 to view the actual data 150 and user defined targets 152. The variance, however, is only listed in the table 160 below the graph 170, which also includes sums or averages of each column. To allow the user flexibility, there are many dimensions 154 (e.g., time, geography, etc.) by which to filter and view the report.

Viewing performance measures with line graphs, bar charts, pie charts, etc. provides a standardized way of analyzing data, but in many scenarios is not enough to get a complete and thorough understanding of the actual process capability. Often, more advanced statistics are required to understand the entire issue or discover opportunities that would normally be overlooked. For example, because the average is within the target range, the data may appear acceptable. However, many data points may actually be outside of the target range. Thus, problem data may be overlooked.

There also exist conventional ad-hoc statistical software packages; however, these packages have limitations as well. Such statistical software packages may be able to assist in measuring the quality of a given process or product. For example, they may calculate a sigma value, which is a statistical parameter that corresponds to a standard deviation on a bell curve. The number of deviations between the statistical mean and the customer defined limits of acceptability provides a quantifiable measurement of process performance. As the process capability increases, so does the sigma level of the process. A process that performs at the six sigma level has six standard deviations between the mean and the customer defined limits, and corresponds to 3.4 defects per million, assuming a normal distribution.

However, to perform a six sigma analysis ideally requires involvement of the entire organization, and hence requires access to information relative to a practical measure (e.g., book-to-ship cycle time), which may be distributed across an organization. Unfortunately, these conventional ad-hoc statistical systems do not generally have access to enterprise wide data, without having to download the data to the ad-hoc statistical software package. Downloading such data is often complex, as it may be stored across many databases across the world, and may be in different formats. Thus, the data may also need to be re-formatted before an analysis may be done. Additionally, some conventional statistical packages require the user to have a considerable knowledge of statistics to be able to produce a usable report. Furthermore, the statistical programs themselves may need to be loaded on each computer upon which an analysis is to be run, which is time consuming and costly.

SUMMARY OF THE INVENTION

Therefore, it would be advantageous to provide a method and system for performing a statistical analysis of enterprise wide data over a single pipeline. A further need exists for a method and system which allow the user to be able to have all the functionality of a conventional business intelligence report and seamlessly transition to a detailed statistical analysis of the data under analysis. A still further need exists for a solution which presents a report with a uniform look and feel to all users in a company. An even further need exists for a system which does not require that the user have extensive knowledge of statistics. A still further need exists for a system which pulls data from existing data repositories. An even further need exists for an efficient mechanism for helping a user to understand where to make process improvements by running statistical simulations. A still further need exists for such a system which provides automatic notification to a user when a performance measure goes outside of a user specified target range.

The present invention provides a method and system for performing a statistical analysis of enterprise wide data over a single pipeline and allows seamless transitions between a detailed statistical analysis of the data under analysis and more conventional BIS analysis. The present invention presents a report with a uniform look and feel to all users in a company and does not require that the user have extensive knowledge of statistics. The present invention efficiently re-uses data from existing data repositories. The present invention provides for statistical simulations and automatic notifications when a performance measure goes outside of a user specified target range.

A method of presenting an analysis of enterprise wide business data is disclosed. In response to a user request to a web site operable to access enterprise wide business data and to provide statistical analysis, a six sigma enabled BIS transfers an electronic document to the user. The electronic document allows the user to select dimensions to specify which data to analyze for a given performance measure. Then, in response to a request from the user for a statistical analysis, the six sigma enabled BIS performs a statistical analysis of the performance measure and transfers an electronic copy of the statistical analysis to the user. In one embodiment the document comprises a histogram. The histogram has an overlay indicator of the statistical mean, as well as a target limit. In this fashion, the user may view the variance in the data, and see how much data are outside the target range.

Other embodiments allow the user to run simulations to see the effect changing a statistical parameter such as the mean or standard deviation will have on the sigma value. In this fashion, the user may see how to best focus improvement efforts. Other embodiments provide a system which provides, in addition to the graphical statistical analysis, an automatic notification when a performance measure goes outside of a user selected target.

The present invention provides these advantages and others not specifically mentioned above but described in the sections to follow.

DETAILED DESCRIPTION OF THE INVENTION

Figure 1:
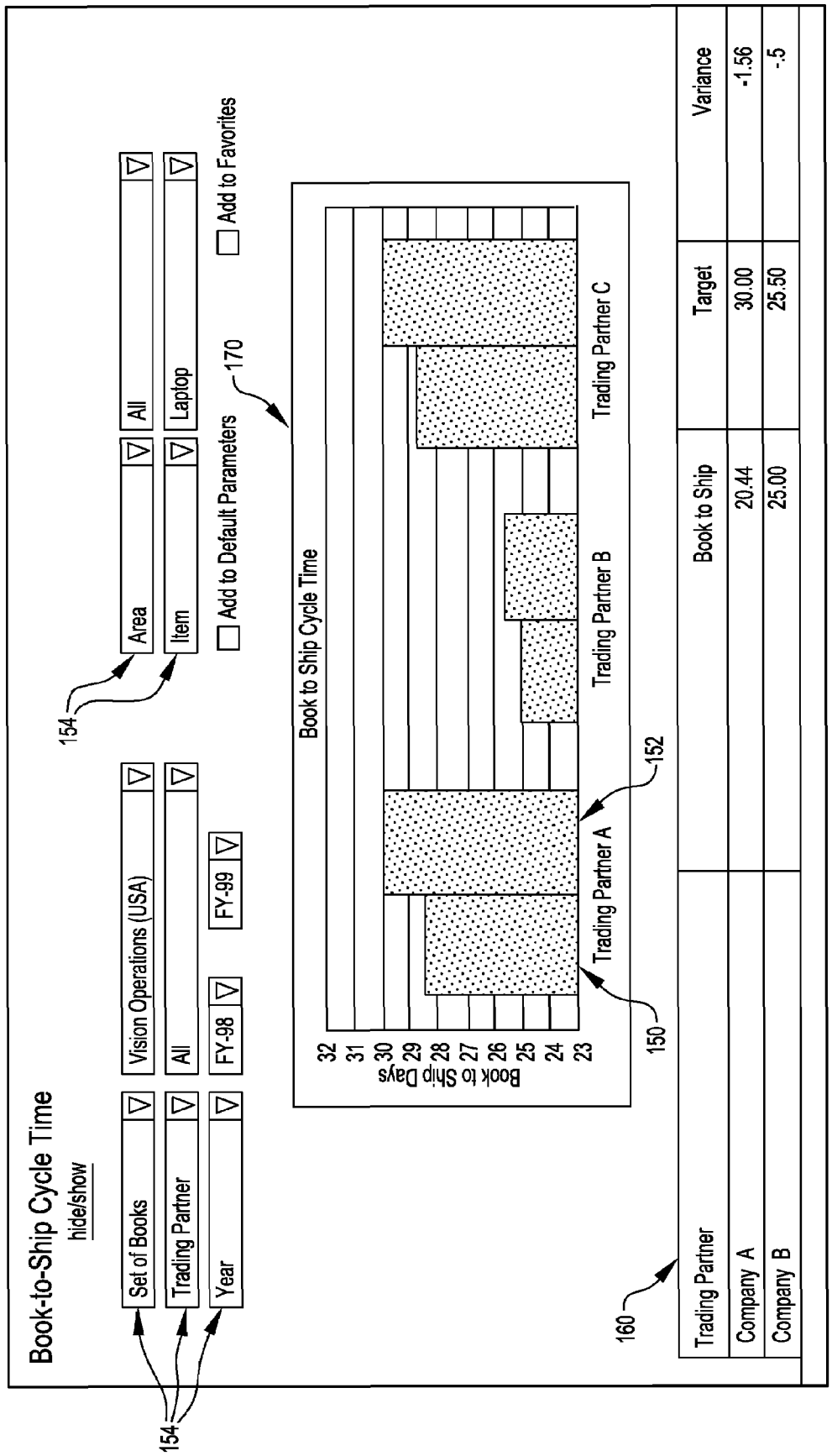
FIG. 1 is an illustration of a bar graph display of business data, according to prior art.

In the following detailed description of the present invention, a method and system for a six sigma enabled business intelligence report, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Six Sigma Enabled Business Intelligence System

The present invention provides the many advanced statistical measures of six sigma analysis in a business intelligence report. A business intelligence system (BIS) may allow, via any web-browser, the ability to analyze performance measures. Performance measures are all the sets of measures that a company would use to access the performance of their enterprise, architectures, or processes. The present invention provides a single pipeline for a multidimensional view of data with a thorough understanding of variation and process capability. In this fashion, key business measures may be comprehensively analyzed in real-time for enterprise wide data.

Definitions

The following definitions may be applied throughout this application.

Actual Value: The calculated value for a performance measure. Collection programs populate summary tables with calculated values and/or the values will be calculated in views. Alerts compare the actual value to the targets in the Performance Management Framework. This actual value will display on the Personal Homepage and on Notification messages.

Dimension: A Dimension is a logical entity with respect to which data may be organized and analyzed. For example, data may be organized by dimensions such as 'Time', 'Item', or 'Trading Partner'.

Dimension Level: The level of granularity for a dimension used in selecting and sorting data within the BIS reports, workbooks and performance management framework. Dimension levels form a hierarchy of specificity that together identify the dimension. For example, with the Time dimension, Year, Quarter, and Month are the different dimension levels.

Performance Management Framework: The BIS component that allows implementation of performance measure tracking. The framework is used to identify and store the performance measure targets and tolerances, alerts to calculate actual values, and workflow to take action on "out of tolerance" situations.

Performance Measure: An indicator used to determine enterprise performance and success. A company will identify relevant performance measures based on the dynamics of the industry and the company's strategic and tactical goals. This term is often used in conjunction with Balanced Scorecard efforts. This may also be known as a Key Performance Indicator (KPI). The performance measures can be viewed by their standard unit of measure or by a sigma value.

Target: A user specified value for a specific performance measure at a certain dimension level and a specific dimension. For example, the target value of 12 might be set for the performance measure Inventory Turns, for the target level of Internal Organization and Time (Financial Period), and the specific dimensions of U.S. Manufacturing and calendar month. For a six sigma enabled business intelligence related report, the Upper and Lower Target Limits may also be defined for the sigma calculation.

Target Level: Used with the Performance Management Framework to identify the dimension level associated with a specific target setup. For example, in setting up a target for the Inventory Turns performance measure, the target level might be Internal Organization and Time (Financial Period).

Tolerance and Lower Target Limit (LTL) and Upper Target Limit (UTL): Used in the Performance Management Framework with Targets to specify a range or boundary around the Target value itself. For example, if the Target for Inventory Turns is 10, the tolerance might be set at +/−10% around 10. In this case, the tolerance would be from 9 to 11.

Figure 2:
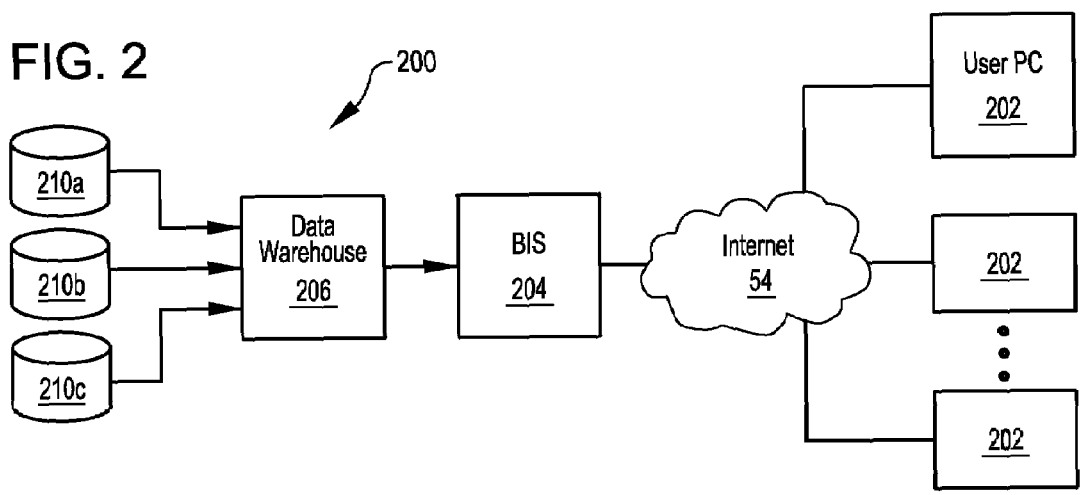
FIG. 2 is an illustration of a diagram illustrating data flow, according to embodiments of the present invention.

FIG. 2 shows the flow of data in a system 200 in which the present invention may be practiced. The six sigma enabled business intelligence system 204 has access to a data warehouse 206. The transactional databases 210 store information on various business transactions, such as orders, shipping dates, revenue, inventory, etc. The transactional databases 210 may reside in different countries and may format the data differently. Commercially available BIS software from Oracle Corporation, Redwood Shores, Calif. is able to collect the data from the various databases 210 and store them in the data warehouse 206 under common dimensions, a common currency, and a common calendar, etc.

Additionally, the commercially available BIS software is able to run reports against the data in the warehouse 206. The commercially available software is able to identify the data set to be analyzed, the dimensions, and the targets. The BIS may then, for example, compare actual shipping dates against targeted shipping dates.

A user is able to access the six sigma enabled BIS 204 via the Internet 54, in the preferred embodiment. Any number of users may access the BIS 204 through any method to access the Internet 54 (e.g., personal computer 202). In the preferred embodiment, the user runs a web-browser to interface with the six sigma enabled BIS 204. However, the access to the six sigma enabled BIS 204 is not limited to Internet access. The present invention provides a standard output for all users, and everyone in the company may see the same basic printout. Therefore, a six sigma analysis is seamlessly deployed across the entire enterprise. Furthermore, the present invention provides a one-touch solution. For example, after a user selects the various dimensions 154 to view in a graph 170, the user may seamlessly transition to a six sigma analysis with a single click.

Six sigma enabled reports portray data in a histogram (e.g., bell curve) format, which displays the variation of the data along with various other statistical parameters. Analyzing data with six sigma enabled BIS 204 provides more details of the data and provides a better understanding of what is driving the higher level "averages" and variation.

Figure 3:
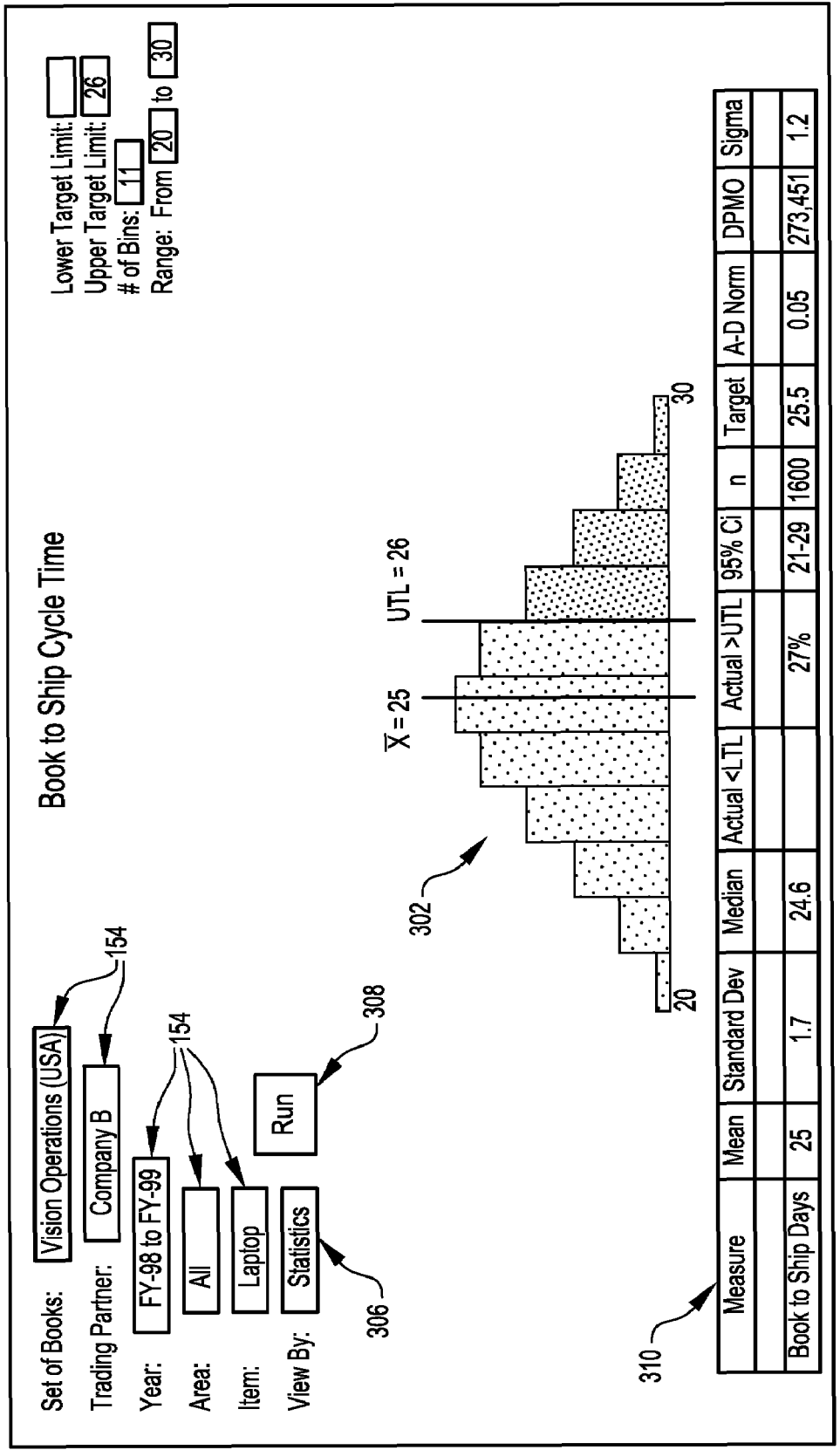
FIG. 3 is a diagram of a histogram comprising statistical analysis of enterprise wide business data, according to embodiments of the present invention.

FIG. 3 illustrates an example of a six sigma enabled BIS report regarding book-to-ship cycle time. The book-to-ship cycle time may be viewed by time, customer, etc. For example, the dimension 154 'year' is 'fiscal year 1998-fiscal year 1999, and the 'item' is 'laptop', etc. The user may also select the upper and lower target limits, the number of bins (e.g., bars), and the range. Furthermore, the 'view by' 306 selection is set to statistics. When the user hits the 'run' button 308, the statistical analysis is presented as the histogram 302.

The calculations are higher level summaries of the book-to-ship cycle time for each sales order line. In this example, the book-to-ship cycle time for Company B is an average of 25 days. Because the upper target limit (UTL) of 26 days is greater than the average of 25, it may appear that the process is under control. However, closer analysis using the six sigma enabled BIS 204 of the present invention, reveals that the distribution (or variation) of book-to-ship cycle times range from 20 to 30 days and that 27% of the cycle times are above the UTL, which could potentially lead to customer dissatisfaction. The low sigma value (2.1) also indicates that considerable data lie above the target limit (UTL). The percent of data out of range and the sigma value may be based on an assumption of a normal data distribution, although the present invention is not limited to this assumption.

The bars or bins in the histogram 302 which lie outside the acceptable target limits may be highlighted. For example, in FIG. 3, those to the left of the target limit (UTL) may be displayed in yellow, while those to the right may be displayed in red to indicate a problem. Thus, the user sees the problem data which a bar graph 170 such as in FIG. 1 fails to reveal.

FIG. 3 also shows a statistical data table 310, which may be displayed below the histogram 302. This table 310 shows statistical parameters such as: the statistical mean, standard deviation, median, actual percentage of data above and below a user specified target, the 95 percent confidence interval, the number of data points (n), the user specified targets, the Anderson-Darling value, the number of defects per one million that are out of range (defects per million opportunities or DPMO), and the sigma value.

Figure 4:
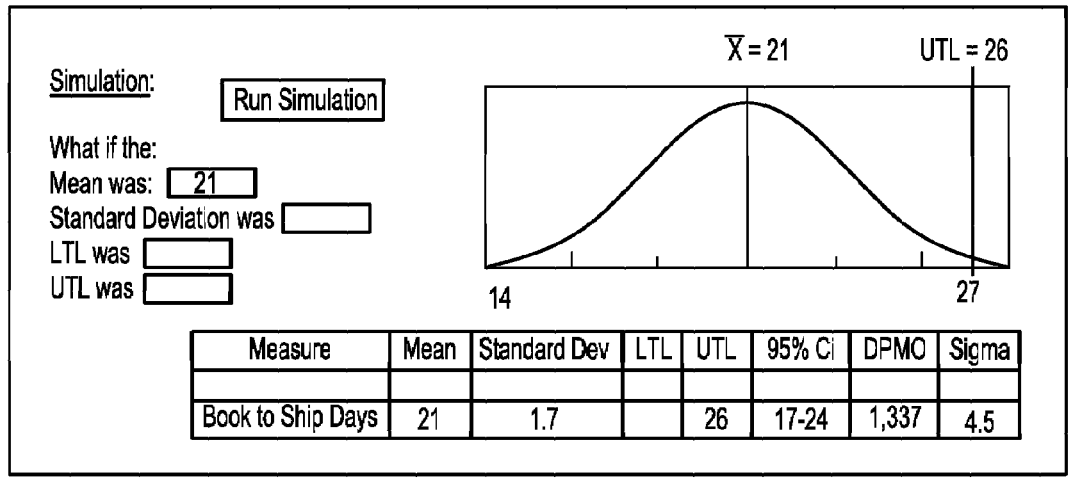
FIG. 4 is a diagram of a simulation used to assist process improvement, according to embodiments of the present invention.

Referring now to FIG. 4, an embodiment allows the user to run simulations on the data from the report (e.g., the data in FIG. 3). For example, the user may input a hypothetical statistical mean, standard deviation, upper target limit, or lower target limit and run a simulation to produce a new histogram. This embodiment quickly recalculates the data via a simulation of a normal distribution. Thus, this provides a quick way of modeling the changes in the target limits, mean, or variation (standard deviation) and understanding the corresponding impact on the sigma value, confidence interval, risk factors, etc. In this fashion, the user gains insight as to where to focus improvement efforts. For example, it may be more beneficial to attempt to change the mean (average) than to reduce the variation of a process of the actual data.

The simulation in FIG. 4 determines the effect of reducing the average book-to-ship cycle time to 21 days, while holding the standard deviation at 1.7. In this case, the sigma value would improve from 2.1 to 4.5. Furthermore, the number of defects per million would decrease from 273,451 to 1,337. In a similar fashion, the user may hold the mean constant while testing a hypothetical standard deviation. The present invention is well suited to simulation with varying other statistical parameters.

Figure 5:
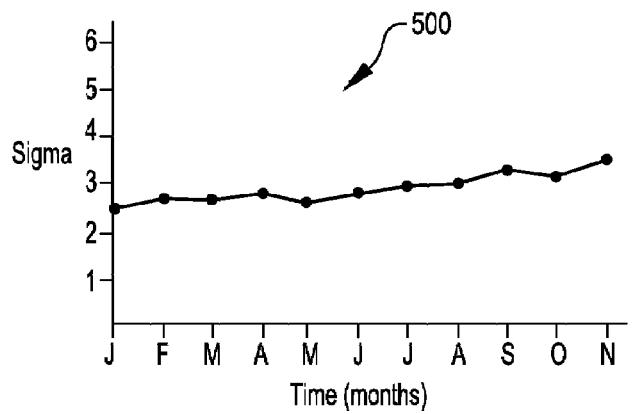
FIG. 5 is a graph of time versus sigma value, according to embodiments of the present invention.

Referring now to FIG. 5, an embodiment produces a graph 500 of the sigma value versus a selected dimension (e.g., time, geography, product, etc.) In this fashion, the user may quickly see the trend of sigma over time.

Figure 6:
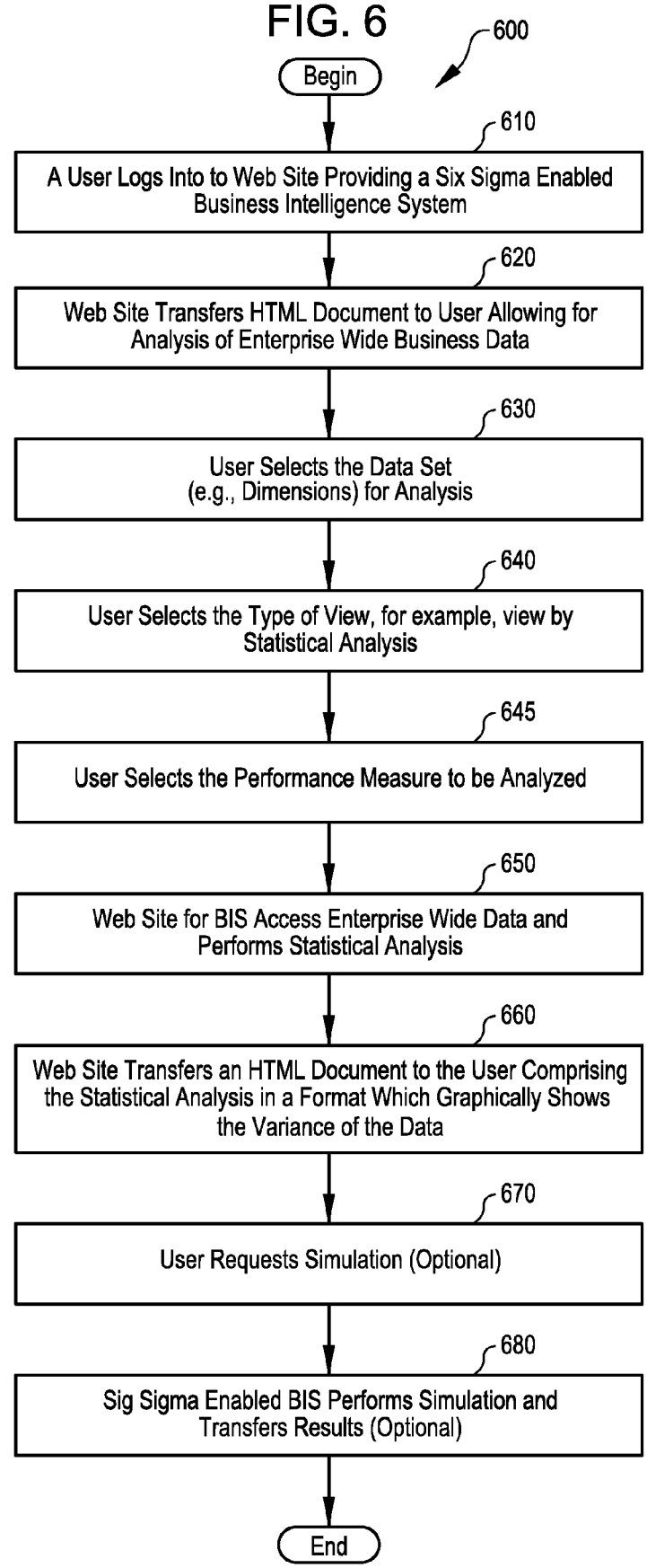
FIG. 6 is a flowchart of the steps of process of performing a statistical analysis of enterprise-wide business data, according to embodiments of the present invention.

FIG. 6 shows a process 600 of providing a six sigma enabled business intelligence system (BIS) 204. In step 610, the web-site for the six sigma enabled BIS 204 receives a user login request. The six sigma enabled BIS 204 is able to access data from across an enterprise. For example, the six sigma enabled BIS 204 has access to a data warehouse 206 that contains enterprise wide data from databases 210.

Figure 7:
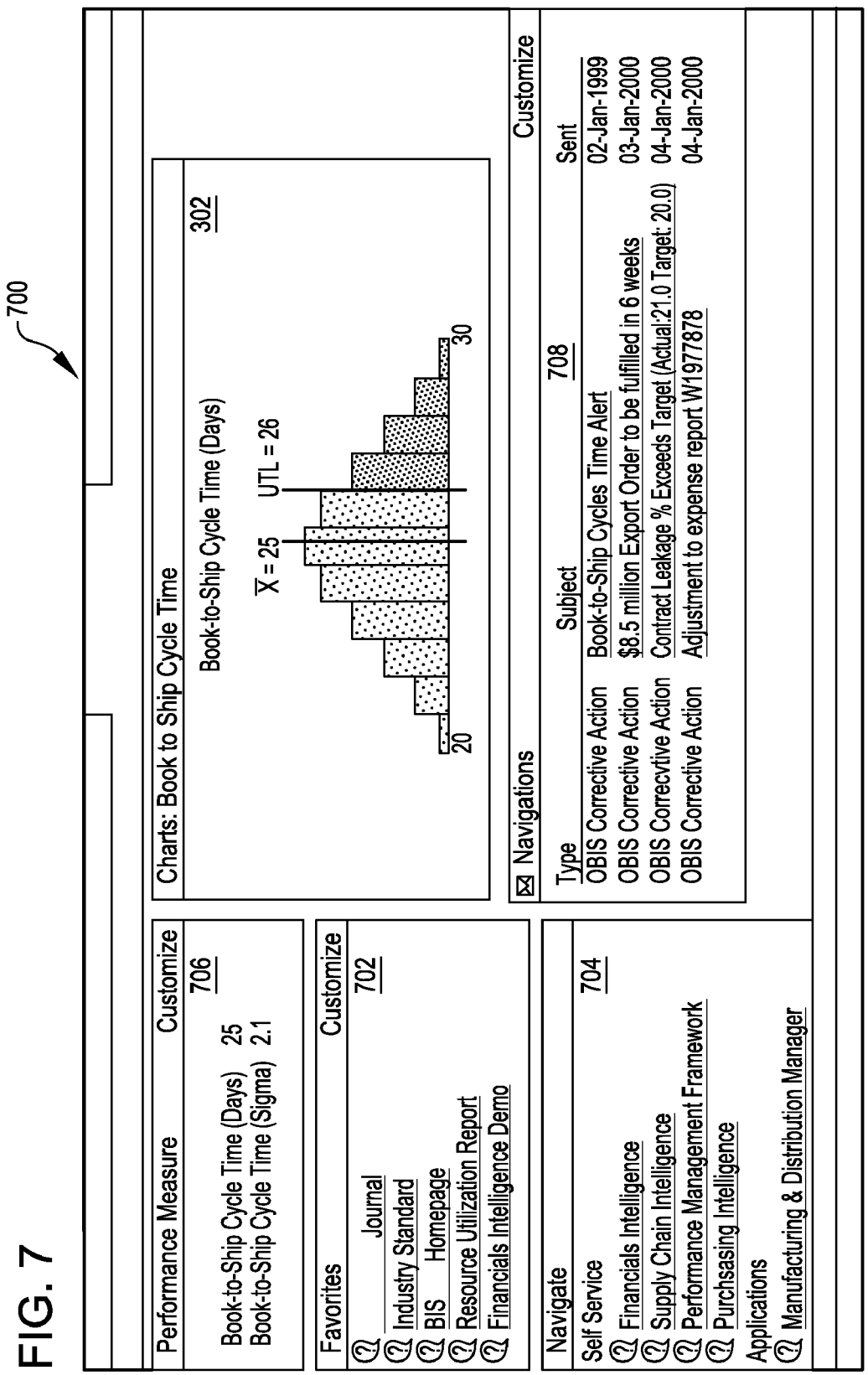
FIG. 7 is an exemplary web-page comprising a histogram of statistical data, according to embodiments of the present invention.

In step 620, the web-site for the six sigma enabled BIS 204 transfers a Hyper-Text Markup Language (HTML) document such as the exemplary personal homepage 700 shown in FIG. 7. As is apparent from FIG. 7, the six sigma enabled BIS provides more functionality than only six sigma analysis. For example links exist in the favorites 702 and navigate 704 boxes on the left of the homepage 700. The web-page 700 may have other formats.

In step 630, the user selects the data set to be analyzed. For example, FIG. 3 comprises selectable dimensions 154. The set of books selected is 'Vision Operations (USA)', the trading partner is company B, the item is 'laptop', etc. The user may also select the target limits, number of bins and range. However, default values are provided if these fields are left blank.

In step 640, the user selects the type of view 306 (e.g., statistical, bar graph, etc.). The user may optionally, switch between views 306. In this fashion, the user is allowed a seamless transition between a six sigma data presentation (e.g., histogram 302) and a conventional business intelligence system presentation. The six sigma enabled BIS 204 may use the same database (e.g., data warehouse 206) to create all data presentations. Thus, the present invention makes efficient use of resources.

In step 645, the user selects the performance measure to be analyzed. Performance measure may be defined as an indicator used to determine enterprise performance and success, for example, book-to-ship cycle time.

In step 650, in response to the user request for a statistical analysis, the six sigma enabled BIS 204 accesses the enterprise data warehouse 206 and performs a statistical analysis of the user selected parameters.

In step 660, the six sigma enabled BIS 204 transfers an HTML document to the user. The document may be one such as shown in FIG. 3. In this fashion, the user receives a six sigma analysis from within a BIS, such that the user may seamlessly transition between the various capabilities that the BIS provides, in addition to six sigma analysis.

In optional step 670, the user requests that a simulation be run on the data. In response to the request for a simulation, the six sigma enabled BIS 204 performs the simulation and transfers the results to the user, in step 680.

Figure 8:
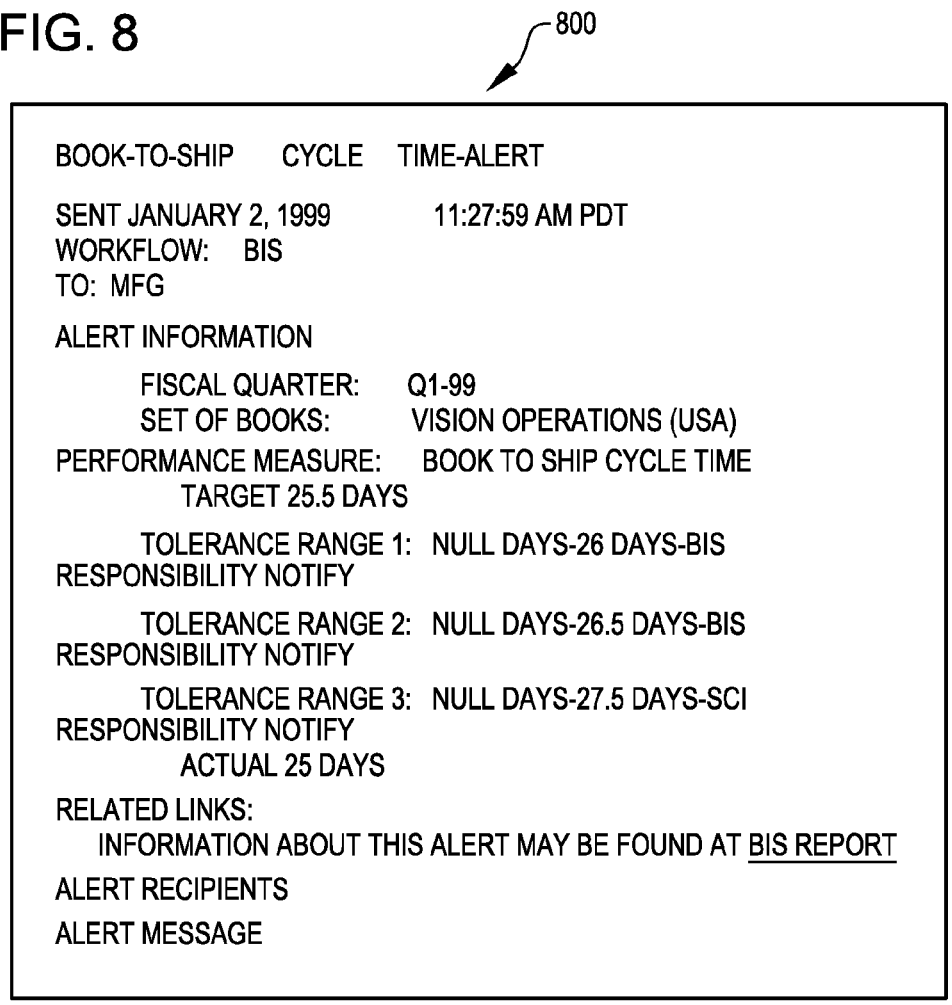
FIG. 8 is an exemplary alert notification, according to embodiments of the present invention.

Referring again to FIG. 7, the HTML page contains a performance measure section 706, including the sigma value for the data in the histogram 302. The HTML page also contains a notifications section 708, which contains links to open a notification. An exemplary notification 800 is seen in FIG. 8.

Figure 9:
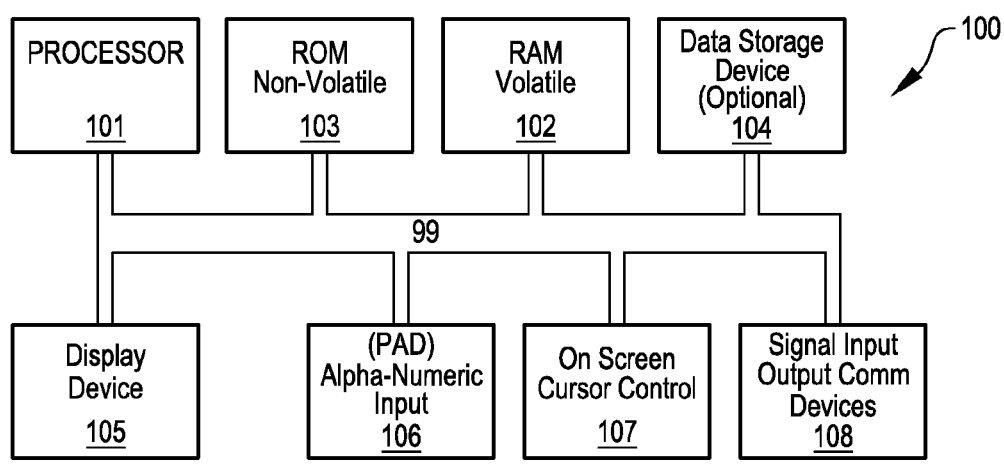
FIG. 9 is a schematic of a computer system, which may be used to implement embodiments of the present invention.

FIG. 9 illustrates circuitry of computer system 100, which may form a platform for embodiments of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 9, system 100 of the present invention also includes an optional alphanumeric input device 106 and function keys coupled to bus 99 for communicating information and command selections to central, processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A signal input/output communication device 108 coupled to bus 99 provides communication with external devices.

Exemplary Calculations for Statistical Parameters

Following are calculations for statistical parameters, although the present invention is well-suited to using other formulas.

Mean: The Mean is the average of the data set. This calculation will be based off of the data that is defined by the user's selection of dimensions and parameters. Mean=Sum of data points/number of data points.

Standard Deviation: The Standard Deviation is the measure of variation for the given data set. The formula is given by: $SQROOT(((n*Sum(x^2))-(Sum(x))^2)/n*(n-1))$ Median: The Median represents the middle of the data set. For example, Median (1, 2, 3, 4, 5)=3 and the Median (1, 2, 3, 5)=2.5

Lower Target Limit (LTL) and Upper Target Limit (UTL): The Lower Target Limit and Upper Target Limit are not calculations. They are user defined in two possible ways.

1. Define Target Limits in PMF (Performance Management Framework). The upper and lower ends of the range from PMF represent the UTL and the LTL. The Upper and Lower Target Limits will be defined in two possible ways:

a. Input a Tolerance % around the Target. This will automatically fill in the Upper and Lower Target Limit numbers.

b. Input the Upper and Lower Target Limit numbers. This will automatically fill in the Tolerance %.

2. Define the UTL and LTL for the simulation. The simulation area lets the user override the UTL and LTL brought in from PMF or enter them as new values if Targets in PMF were not set up.

Actual<LTL and Actual>UTL: The Actual<LTL is the Actual % of data that is below the Lower Target Limit. The Actual>UTL is the Actual % of data that is above the Upper Target Limit: Actual<LTL=(# of data points below the LTL)/Total # of data points*100

95% CI (95% Confidence Interval): The 95% Confidence Interval of the data set. It is the prediction interval where 95% of the data will fall between. 95% CI=Mean+/−1.96*Standard Deviation. For example, 95% CI where (Mean=5, Stdev=1)=>5+/−1.96*1=>3.04 to 6.96

Range of Data: The Range of Data is simply the lowest value to the highest value in the given data set. The actual lowest and highest values will be returned for these fields, but may be overrided by inputting values. The reason is to eliminate outliers and recalculate.

# of Bins: The # of Bins (also known as Buckets or Classes) refers to the # of Bins in the Histogram (the bars that make up the graph). This is somewhat of a controversial issue since having too few Bins could cover up a trend and too many could dilute any trends. The rule of thumb is to choose between 5 and 20 Bins for any given data set. Following is a simple matrix to use:

| # of different data points | # of bins |
| --- | --- |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12-100 | 11 |
| 101-200 | 15 |
| >200 | 20 | n (Sample Size): n represents the number of data points in the data set. It is the Sample Size.

A-D Normality (Anderson-Darling Normality Test): The Anderson-Darling Normality test is a test to see if the data is normally distributed. The test will yield a Pvalue that should be larger than 0.05 for normal data. If the Pvalue is less than 0.05, it cannot be stated for certain that the data is normal.

$$A_n^2 = \left( \left\{ -\sum_{i=1}^{n} (2i-1)[\ln Z_i + \ln(1 - Z_{n+1-i})] \right\} / n - n \right)$$

The Pvalue is found in a corresponding cross reference table.

Probability of being below the LTL: The probability of being below the LTL is based off of a normal distribution and the Z deviate (Z table). To calculate the Probability, the Z deviate is first calculated as:

Z=(X−LTL)/Stdev [(Mean−Lower Target Limit) divided by the Standard Deviation

Once the Z deviate is found, the probability can be found by looking it up in the Z table which is found in any statistics book.

Probability of being above the UTL: The probability of being above the UTL is based off of a normal distribution and the Z deviate (Z table). To calculate the Probability, the Z deviate is first calculated as:

Z=(UTL−X)/Stdev [(Upper Target Limit−Mean) divided by the Standard Deviation

Once the Z deviate is found, the probability can be found by looking it up in the Z table which is found in any statistics book.

Sigma or Z (Short Term): The value is calculated from the Z table. The "Probability of being above the UTL" is added to the "Probability of being below the LTL". This Total Probability is looked up on the Z table (area under the curve) and related back to a Z deviate. This value represents the Long Term Sigma. A common rule of six sigma Methodology says that a Short Term Sigma can be represented as the Long Term Sigma+a 1.5 sigma shift. This reasoning is based on the fact that over a long period of time, the distribution will spread out due to time related sources of error which tend to upset process centering as compared to the Short Term Data gathering/analysis. The "Six Sigma Level of Excellence" is based off of the short term (Zst). If your data is short term in nature, then the resultant sigma value will be short term. If your data is long term in nature, the Zst is calculated off of the Long Term Sigma+1.5. So, Zst=Zlt+1.5 shift.

Guidelines for the Correction of Sigma Values (Excerpt from "The Vision of Six Sigma: Tools and Methods for Breakthrough" by Mikel J. Harry—1994

Guideline 1: If a metric is computed on the basis of data gathered over many cycles or time intervals, the resultant value should be regarded as a long-term measure of performance. Naturally, the long-term metric must be converted to a probability. Once expressed as a probability, Z.lt value may be established by way of a table of area-under-the-normal-curve, or any acceptable computational device. If we seek to forecast short-term performance (Z.st), we must add a shift factor (Z.shift) to Z.lt so as to remove time related sources of error which tend to upset process centering. Recognize that the actual value of Z.shift is seldom known in practice; therefore, it may be necessary to apply the accepted convention and set Z.shift=1.50; otherwise, use the actual value. As a consequence of this linear transformation, the final Z value should reflect only random sources of error and, therefore, serve as a projection of short-term performance. Thus, we are able to artificially remove the effect of non-random influences (i.e., normal process centering errors) from the analysis via the transform Z.st=Z.lt+Z.shift.

Guideline 2: If the metric is computed on the basis of data gathered over a very limited number of cycles or time intervals, the resultant value should be regarded as a short-term measure of performance. Naturally, the short-term metric must be converted to a probability. Once expressed as a probability, Z.st may be established by way of a table of area-under-the-normal-curve, or any acceptable computational device. If we seek to forecast long-term performance, we must subtract Z.shift from the Z.st so as to approximate the long-term capability. Recognize that the actual value of Z.shift is seldom known in practice; therefore, it may be necessary to apply the accepted convention and set Z.shift=1.50. If the actual value is known, use it. As a consequence of this linear transformation, the final Z value reflects both random and non-random sources of error and, therefore, is a projection of long-term performance. Thus, we are able to artificially induce the effect of non-random influences (i.e., normal process centering error) into the analysis by way of Z.st−Z.shift=Z.lt.

Guideline 3: In general, if the originating data is discrete by nature, the resulting Z transform should be regarded as long-term. The logic of this guideline is simple; a fairly large number of cycles or time intervals is often required to generate enough non-conformities from which to generate a relatively stable estimate of Z. Hence, it is reasonable to conclude that both random and non-random influences are reflected in such data. In this instance, guideline 1 would be applied.

Guideline 4: In general, if the originating data is continuous by nature and was gathered under the constraint of sequential or random sampling across a very limited number of cycles or time intervals, the resulting Z value should be regarded as short-term. The logic of this guideline is simple; data gathered over a very limited number of cycles or time intervals only reflects random influences (white noise) and, as a consequence, tends to exclude non-random sources of variation, such as process centering errors.

Guideline 5: Whenever it is desirable to report the corresponding "sigma" of a given performance metric, the short-term Z must be used. For example, let us suppose that we find 6210 ppm defective. In this instance, we must translate 6210 ppm into its corresponding "sigma" value. Doing so reveals Z.lt=2.50. Since the originating data was long-term by nature, guideline 1 and 3 apply. In this case, Z.lt+Z.shift=2.5+1.5=4. Since no other estimate of Z.shift was available, the convention of 1.5 was employed.

The preferred embodiment of the present invention, a method and system for a six sigma enabled business intelligence system, is thus described. While the present invention has been described in particular embodiments, it should be appreciated that the present invention should not be construed as limited by such embodiments, but rather construed according to the below claims.

We claim:

1. A method of presenting an analysis of enterprise wide business data, the enterprise wide business data collectively stored in a plurality of data repositories, comprising the steps of:
   collecting transactional data from the plurality of data repositories into warehouse data stored in a uniform format in a data warehouse;
   in response to a first user request to a web site operable to access said warehouse data and to provide statistical analysis, including six sigma analysis of said enterprise wide business data, transferring an electronic document to said user, wherein said electronic document allows said user to select parameters for a data set in said enterprise wide business data and a performance measure to be analyzed for the data set defined by the parameters;
   in response to a second request from said user to said website, performing statistical analysis including six sigma statistical analysis of said performance measure for said data set according to said parameters;
   transferring results of said statistical analysis to said user, said results including a histogram and an indicator of a target limit specified by said user, wherein an area of the histogram outside the target limit is highlighted so as to differentiate the area of the histogram outside of the target limit from the area of the histogram inside of the target limit, and wherein a relative number of defects are graphically visible with the results;
   in response to an electronic request from said user to said website, running a simulation to determine the effect that varying a statistical parameter specified by said user of a plurality of statistical parameters has on another statistical parameter; and
   electronically transferring the results of said simulation to said user over a communications network, wherein the user is presented a graphical display providing information to assist in quality improvement.

2. The method of claim 1 wherein said transferring comprises:
   transferring a Hyper-Text Markup Language document comprising said results of said statistical analysis in histogram format.

3. The method of claim 2 further comprising:
   overlaying on said histogram an indicator of a statistical mean and the indicator of the target limit.

4. The method of claim 1 wherein said plurality of statistical parameters comprise statistical mean, standard deviation, a user specified target, actual percentage of data above and below said user specified target, and sigma value.

5. The method of claim 1 further comprising the steps of:
   in response to a request from said user to said website to determine a trend of a statistical parameter over time, determining said trend; and
   electronically transferring a Hyper-Text Markup Language document comprising a display of said trend.

6. The method of claim 5 wherein said statistical parameter is a sigma value.

7. The method of claim 1 further comprising:
   determining if a particular statistical parameter for said performance measure is outside a particular target specified by said user; and
   automatically providing a notification to said user if said particular statistical parameter is outside the particular target, wherein said notification comprises an electronically delivered message to a user specified node.

8. The method of claim 7 wherein said determining comprises:
   analyzing said performance measure according to a periodic rate specified by said user.

9. An Internet-based system comprising:
   a plurality of data repositories collectively comprising transactional business data from across an enterprise;
   a computer system including at least one processor, said computer system operable to use said at least one processor to access said data repositories, to collect data from said data repositories into a data warehouse comprising warehouse data stored in a uniform format, to perform a statistical analysis, including six sigma analysis, of said warehouse data, to receive user-generated requests via the Internet for execution of a user-defined statistical analysis of a user-selected performance measure for said warehouse data according to user-defined parameters of a dataset in said warehouse data, to deliver Hyper-Text Markup Language document via the Internet to an Internet node in response to said user-generated analysis requests, wherein said Hyper-Text Markup Language document directs a browser to provide graphical display of said statistical analysis including:
      the statistical variance of said performance measure;
      a histogram of an indicator of a target limit specified by said user, wherein an area of the histogram outside the target limit is highlighted so as to differentiate the area of the histogram outside of the target limit from the area of the histogram inside of the target limit, and wherein a relative number of defects are graphically visible in said graphical display; and
   wherein the computer system is operable to use said at least one processor to respond to an electronically transferred request from an Internet node to perform a statistical simulation, and to electronically transfer a Hyper-Text Markup Language document comprising the results of said statistical simulation, wherein a user is allowed to view a web-page which displays said statistical simulation.

10. The Internet-based system of claim 9 wherein said computer system is further operable to:
    analyze said transactional business data to determine if a statistical parameter for a performance measure is outside a user specified target, and if so, to automatically notify said user, wherein said notification comprises an electronic message to a user specified electronic address.

11. The Internet-based system of claim 9 wherein said computer system is further operable to:
    format said statistical analysis in histogram format.

12. A method of implementing a business intelligence system in a distributed computing environment, said method comprising the steps of:
    in response to a user-generated request received from a peripheral computer system, transferring, from a host computer system, an electronic document to said peripheral computer system, wherein said electronic document has selectable fields for a plurality of dimensions to select a data set accessible by said host computer system, said data set from a plurality of data repositories having transactional data stored therein;

in response to a user-generated request received from said peripheral computer for a statistical analysis, including six sigma analysis, of a user-selected performance measure for said data set, performing said statistical analysis at the host computer system;

transferring from said host computer system an electronically viewable version of said statistical analysis to said peripheral computer system, said results including a histogram and an indicator of a target limit specified by said user, wherein an area of the histogram outside the target limit is highlighted so as to differentiate the area of the histogram outside of the target limit from the area of the histogram inside of the target limit, and wherein a relative number of defects are graphically visible with the results;

collecting said data from a plurality of databases;

formatting said data in a single format, wherein data from multiple databases in multiple formats is converted to a single format and stored on a single database, and wherein said peripheral computer system does not have direct access to said databases;

in response to an electronic request received from the peripheral computer system, running a simulation to determine the effect that varying a statistical parameter specified by said user of a plurality of statistical parameters has on another statistical parameter; and electronically transferring the results of said simulation to said peripheral computer system over a communications network for graphical display to the user for providing information to assist in quality improvement.

13. The method of claim 12 further comprising providing a standardized presentation of said statistical analysis to multiple distributed peripheral computer systems.

14. The method of claim 12 wherein said transferring comprises:

formatting said statistical analysis in graphical format, wherein the variance of said data set is graphically viewable.

15. The method of claim 14 wherein said formatting comprises highlighting data points which are outside of the target range in a manner differentiating said data points outside of the target range from data points within the target range.

16. A computer-readable storage medium having stored thereon instructions for causing a computer system to perform a method of presenting an analysis of enterprise wide business data, the enterprise wide business data collectively stored in a plurality of data repositories, the method comprising the steps of:

collecting transactional data from the plurality of data repositories into warehouse data stored in a uniform format in a data warehouse;

in response to a first user request to a web site operable to access said warehouse data and to provide statistical analysis, including six sigma analysis of said enterprise wide business data, transferring an electronic document to said user, wherein said electronic document allows said user to select parameters for a data set in said enterprise wide business data and a performance measure to be analyzed for the data set defined by the parameters;

in response to a second request from said user to said website, performing statistical analysis including six sigma statistical analysis of said performance measure for said data set according to said parameters;

transferring results of said statistical analysis to said user, said results including a histogram and an indicator of a target limit specified by said user, wherein an area of the histogram outside the target limit is highlighted so as to differentiate the area of the histogram outside of the target limit from the area of the histogram inside of the target limit, and wherein a relative number of defects are graphically visible with the results;

in response to an electronic request from said user to said website, running a simulation to determine the effect that varying a statistical parameter specified by said user of a plurality of statistical parameters has on another statistical parameter; and electronically transferring the results of said simulation to said user over a communications network, wherein the user is presented a graphical display providing information to assist in quality improvement.

17. The computer-readable storage medium of claim 16, wherein the method further comprises:

in response to a request from said user to said website to determine a trend of a statistical parameter over time, determining said trend; and electronically transferring a Hyper-Text Markup Language document comprising a display of said trend.

18. The computer-readable storage medium of claim 16, wherein the method further comprises overlying on said histogram an indicator of a statistical mean and the indicator of the target limit.

19. The computer-readable storage medium of claim 16, wherein the method further comprises:

determining if a particular statistical parameter for said performance measure is outside a particular target specified by said user; and automatically providing a notification to said user if said particular statistical parameter is outside the particular target, wherein said notification comprises an electronically delivered message to a user specified node.

20. The computer-readable storage medium of claim 19, wherein said determining comprises analyzing said performance measure according to a periodic rate specified by said user.

* * * * *

UNITED STATES PATENT AND TRADEMARK OFFICE
CERTIFICATE OF CORRECTION

PATENT NO.         : 7,657,451 B2                                                        Page 1 of 1
APPLICATION NO. : 09/851732
DATED              : February 2, 2010
INVENTOR(S)        : Timothy M Dubois et al.

It is certified that error appears in the above-identified patent and that said Letters Patent is hereby corrected as shown below:

Title Page, (*) Notice: delete "681 days" and insert -- 1265 days --.

Title Page, Item (56) on page 2, in column 2, under "Other Publications", line 7, delete "Qeustions" and insert -- Questions --, therefor.

Title Page, Item (56) on page 2, in column 2, under "Other Publications", line 9, delete "Shick," and insert -- Schick, --, therefor.

On sheet 5 of 7, in Figure 6, Ref. Numeral 610, line 1, after "Into" delete "to".

On sheet 5 of 7, in Figure 6, Ref. Numeral 680, line 1, delete "Sig" and insert -- Six --, therefor.

On sheet 6 of 7, in Figure 7, Ref. Numeral 704, line 5, delete "Purchsasing" and insert -- Purchasing --, therefor.

On sheet 6 of 7, in Figure 7, Ref. Numeral 708, line 4, delete "Correcvtive" and insert -- Corrective --, therefor.

In column 6, line 2, delete "1999," and insert -- 1999', --, therefor.

In column 7, line 7, after "BIS" insert -- 204 --.

In column 7, line 9, delete "example" and insert -- example, --, therefor.

In column 8, line 1, after "106" insert -- including alphanumeric --.

In column 8, line 2 , delete "central," and insert -- central --, therefor.

In column 8, line 59, delete "overrided" and insert -- overridden --, therefor.

Signed and Sealed this

Fourteenth Day of September, 2010

David J. Kappos
*Director of the United States Patent and Trademark Office*